(12) United States Patent
Heldberg

(10) Patent No.: US 7,757,960 B2
(45) Date of Patent: Jul. 20, 2010

(54) THERMOSTAT VALVE FOR A COOLING SYSTEM OF A COMBUSTION ENGINE

(75) Inventor: Carsten Heldberg, Kirchlinteln (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 656 days.

(21) Appl. No.: 11/402,846

(22) Filed: Apr. 13, 2006

(65) Prior Publication Data

US 2006/0245930 A1   Nov. 2, 2006

(30) Foreign Application Priority Data

Apr. 18, 2005  (DE) .................. 10 2005 018 904

(51) Int. Cl.
*F01P 7/02* (2006.01)

(52) U.S. Cl. .................. 236/34; 236/93 A; 236/99 J; 236/100

(58) Field of Classification Search .................. 236/34, 236/34.5, 93 R, 93 A, 99 R; 123/41.01; 137/629
See application file for complete search history.

(56) References Cited

U.S. PATENT DOCUMENTS

| | | | | |
|---|---|---|---|---|
| 4,082,219 A | * | 4/1978 | Rogers et al. | 236/12.2 |
| 4,471,804 A | * | 9/1984 | Bauer | 137/493.8 |
| 4,485,899 A | * | 12/1984 | Grundei | 188/277 |
| 5,188,287 A | * | 2/1993 | Chamot | 236/34.5 |
| 5,390,703 A | * | 2/1995 | Tengesdal | 137/629 |

(Continued)

FOREIGN PATENT DOCUMENTS

DE   3101248 A1   2/1982

(Continued)

OTHER PUBLICATIONS

EP Search Report for Application No. 06005699.1 mailed Nov. 16, 2007.

*Primary Examiner*—Frantz F Jules
*Assistant Examiner*—Alexis K Cox
(74) *Attorney, Agent, or Firm*—Lowe Hauptman Ham & Berner LLP

(57) ABSTRACT

A thermostat valve for a cooling system of a combustion engine, comprising a disc-shaped valve member, having a sealing portion and biased by a spring against an annular valve seat provided in a valve housing, a thermal extension element (DWE) within the valve housing which acts on the valve member opposite to the valve spring, characterized in that the valve member includes two separate parts, the first part being an annular member having an outer annular sealing portion and an inner annular sealing portion, the outer sealing portion cooperating with the valve seat and the second part being a plug-shaped member and extending through the annular member, the plug-shaped member having an outer annular sealing portion which in the closed position of the plug-shaped member cooperates with the inner sealing portion of the annular member, the plug-shaped member cooperating with the thermal extension element (DWE) and being structured such that upon an initial movement of the plug-shaped member by the thermal extension element a passage is formed between the inner sealing portion of the annular member and the outer sealing portion of the plug-shaped member and that upon further movement of the plug-shaped member the annular member is co-moved and lifted from the valve seat.

8 Claims, 2 Drawing Sheets

U.S. PATENT DOCUMENTS 5,690,276 A * 11/1997 Thiel et al. .................. 236/34.5
6,167,902 B1 * 1/2001 Nelson .................... 137/315.4

FOREIGN PATENT DOCUMENTS

| | | |
|---|---|---|
| DE | 9109600.6 U1 | 1/1993 |
| DE | G 91 09 600.6 | 1/1993 |
| DE | 44 12 482 A1 | 10/1995 |
| DE | 199 05 466 A1 | 8/2000 |
| FR | 2858678 A1 | 2/2005 |
| SU | 1 488 653 A1 | 6/1989 |

* cited by examiner

THERMOSTAT VALVE FOR A COOLING SYSTEM OF A COMBUSTION ENGINE

RELATED APPLICATIONS

The present application is based on, and claims priority from, German Application Number 10 2005 018 904.0, filed Apr. 18, 2005, the disclosure of which is hereby incorporated by reference herein in its entirety.

FIELD OF THE INVENTION

The invention relates to a thermostat valve for a cooling system of a combustion engine.

Thermostat valves are generally used in cooling systems for combustion engines. They have the property of allowing the passage of a flow depending on temperature. In cooling systems, it is common for a thermostat valve not to open until a certain temperature is reached in the coolant. It is not until then that the coolant is led over a heat exchanger (cooler) or the like.

The temperature-dependent actuation of the valve is commonly performed by means of a so-called expansive-material element, specifically an expansive-wax element, in which the medium which expands in dependence on temperature is formed by a wax.

The valve member of a thermostat valve is biased against the sealing seat by means of at least one spring. Its opening direction frequently is against the direction of flow. This is necessary because otherwise the valve will possibly be opened by the pressure of the coolant pump. In thermostats having no regulated bypass, the pressure of the coolant acts on the valve member in addition to the biasing pressure of the spring so that the expansive-material element has to overcome both the spring pressure and flow pressure of the coolant. As soon as the valve member has been opened a pressure balance will be largely established on the valve member so that the expansive-material element only needs to overcome the counteracting force of the spring.

The flow resistance requires to be small to enable the coolant pump to deliver a large amount of coolant. Accordingly, the diameter of the valve disc of the thermostat valve will be large. This means that the valve member is under a quite significant force which needs to be overcome at first by the expansive-material element. As a result, the point at which the thermostat opens will be shifted upwards by some (5-8) degrees. When it closes an additional dynamic force will occur at certain operating points in the closing direction that can press the thermostat to close for a short time. Since the dynamic fraction does not occur in this case the thermostat will open again shortly afterwards and a regulating oscillation will result.

It is the object of the invention to provide a thermostat valve for a cooling system of a combustion engine that can be designed for large flow rates with no adverse effect on the behaviour of the thermostat valve.

In the inventive thermostat valve, the valve member is comprised of two separate components the first one of which is an annular component which has an outer annular sealing portion and an inner annular sealing portion. The outer annular sealing portion interacts with the valve seat. The second component is extended, as a tappet component, through the annular component and has an outer annular sealing portion which, when the tappet component is in the closing position, sealingly interacts with the inner sealing portion of the annular component. The tappet component is acted on by the load of the expansive-material element and is configured such that when the tappet component initially is displaced by the expansive-material element a passage is defined between the sealing portions and, when the tappet component continues to be displaced, said component carries the annular component along and is lifted off the valve seat.

The configuration of the inventive thermostat valve is such as to define a more or less large passage between the two valve member components when the expansive-material element lifts slightly for the first time. Since the effective area of the tappet component is relatively small the opening forces which are produced by the coolant fluid will be small as well and there will be no retarded opening motion of the thermostat. Furthermore, a smooth opening motion is achieved. If the valve is supposed to be opened more with an increase in temperature it will carry along the annular component. It will then merely be necessary to overcome the force of the spring to cause the valve member to open, which is the annular component here. Hence, the opening force of the annular component solely depends upon the design of the spring and no longer on the initial pressure of system pressure of the cooling system.

The closing motion initially will involve a closure of the annular component whereas the tappet member still remains open. The dynamic forces have ceased to be within the critical range because the effective area is smaller. There will be no regulating oscillations.

It is understood that the displacement path of the expansive-material element is composed of two portions, i.e. a first portion to open the passage between the tappet and annular components and a second portion which is required to lift the annular component off the valve seat. Thus, the entire displacement path of lift of the expansive-material element causing the inventive thermostat valve to open is somewhat larger than that of conventional thermostat valves. However, since expansive-material elements having a lift of from 8 to 10 mm are available a sufficient displacement path is provided to move an inventive thermostat valve to its opening position.

The inventive thermostat valve also has the advantage of excluding the need to modify conventional valve casings, which usually are formed integrally with a pipe casing for a cooling system, over conventional configurations.

In an aspect, the annular component is composed of two annular discs to sandwich an inner and outer sealing rings. A valve member formed from two discs is generally known for thermostat valves. The peculiar feature is that an inner and an outer sealing ring are provided.

In another aspect of the invention, a provision is made that the second outer sealing portion on the tappet component is defined by a conical surface. Preferably, the tappet component is acted on by the biasing spring which, hence, urges the conical sealing surface of the tappet component against the inner sealing portion of the annular component.

In another aspect of the invention, a provision is made that the tappet component has a radial flange or radial arms which comes/come to bear against the annular component when the tappet component is displaced by the expansive-material element. The flange carries the annular component along as soon as the expansive-material element has carried out the initial lift to open the first passage between the inner sealing portion of the annular component and the outer sealing portion of the tappet component.

Various constructional solutions can be imagined to configure the tappet component. In an aspect of the invention, a provision is made that the tappet component consists of two portions disposed in an axial succession which are held together via a screwed joint wherein one portion has the outer sealing portion and the other one has the flange.

Another option to achieve the object of the invention may consist in that the valve member has provided therein a duct which bridges over the annular sealing portion of the valve member. This duct is closed by a second valve member when the valve member is in the closing position. This second valve member is also actuated by the expansive-material element while it starts its displacing motion from a predetermined temperature onwards. The configuration of the second valve member is such as to open momentarily before the first valve member is lifted off the valve seat. It is also in this manner that a pressure balance is achieved on the thermostat valve, which causes the valve member to open nearly independently of the pressure, it merely being necessary to overcome the force of the closing spring as is generally common.

An embodiment of the invention will be described below with reference to the drawings.

FIG. 1 schematically shows a section through a thermostat valve according to the invention.

Figure 1:
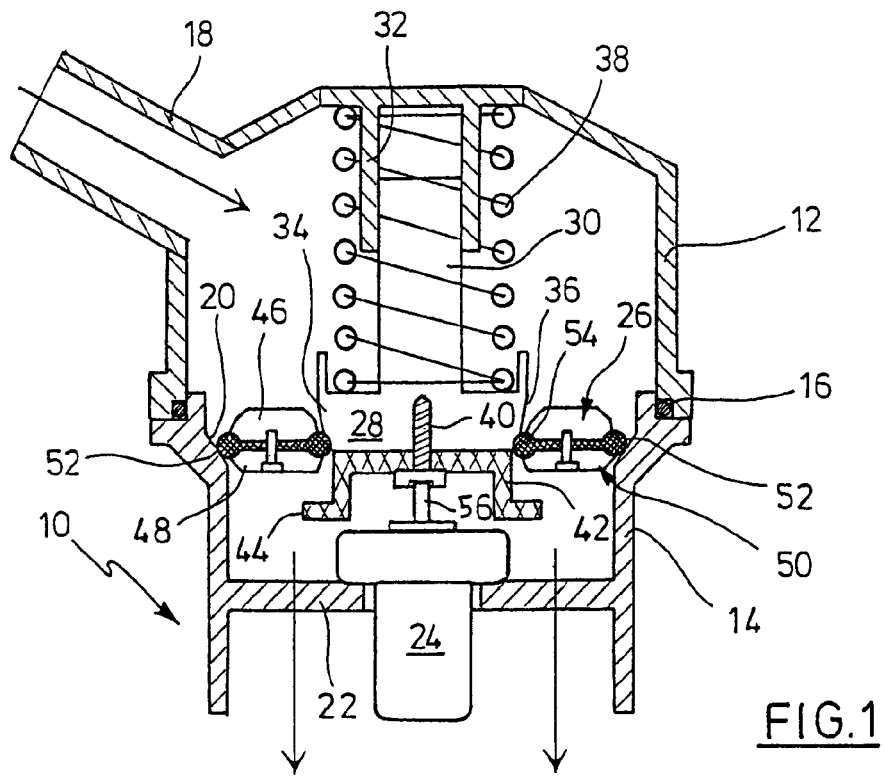
Figure 2:
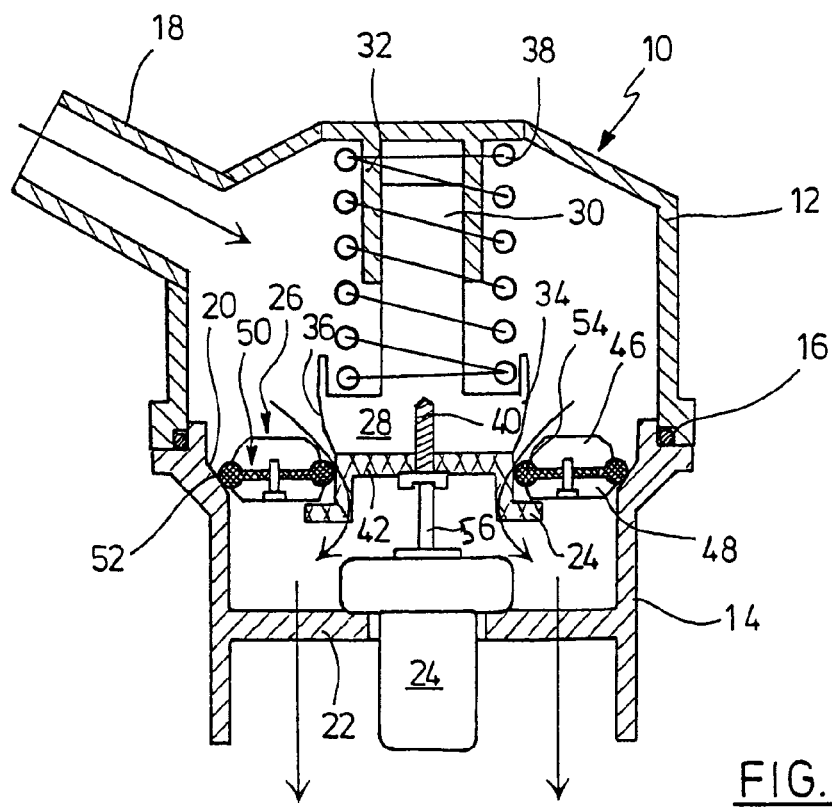
FIG. 2 shows the thermostat valve of FIG. 1 at a first opening phase.
Figure 3:
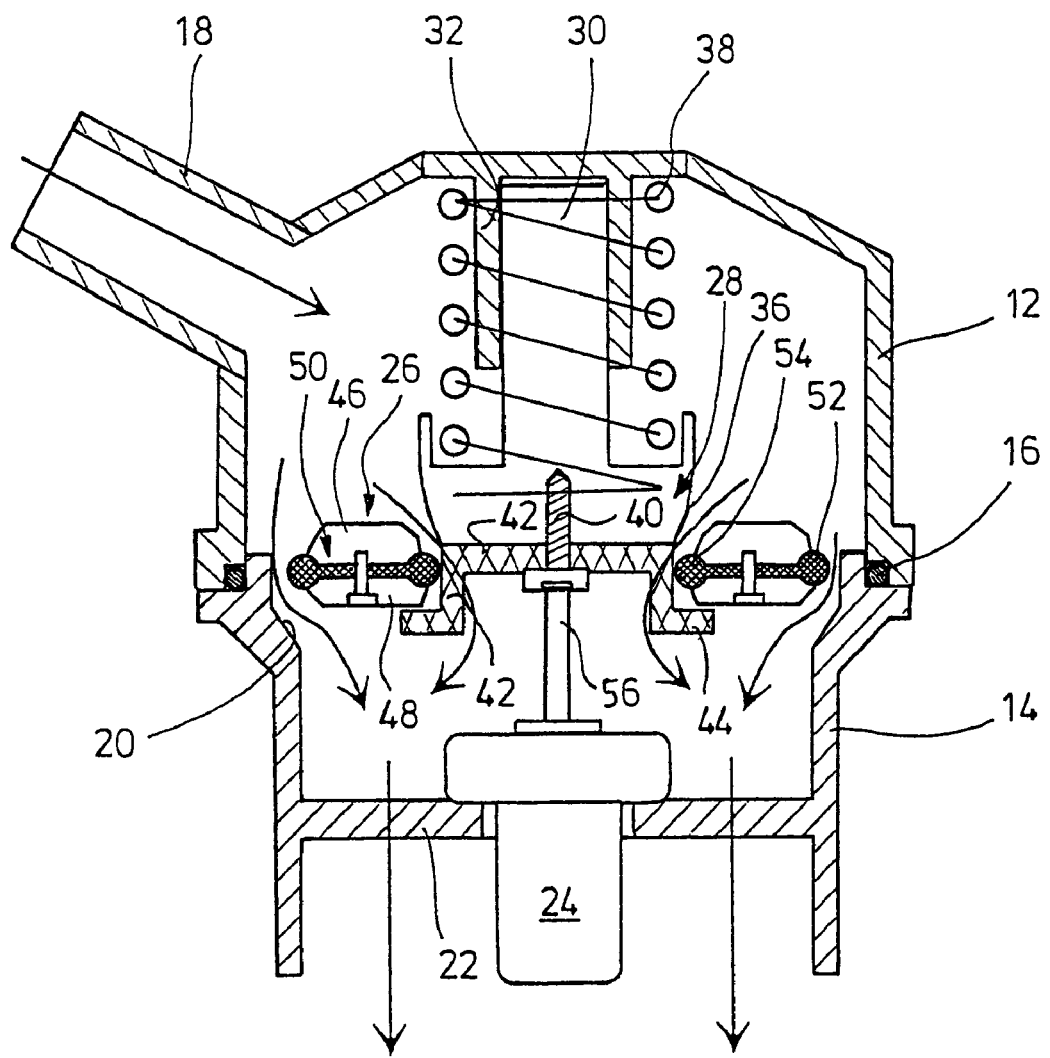
FIG. 3 shows the thermostat valve of FIG. 1 when completely opened.

The thermostat valve 10 which is shown in FIGS. 1 through 3 has a casing composed of two components 12, 14 where the components thereof are sealed via a sealing ring 16. The upper component has a pipe connection 18 which is coupled to a cooler, not shown, of a cooling system, not shown, for a combustion engine.

The lower casing component 14 has a conical valve seat 20 in the upper region and has a series of arms 22, on which a expansive-material element 24 is supported, at bottom. The expansive-material element 24 has a tappet 56 which is movable in its position in dependence on the temperature of the coolant, e.g. water flowing through the casing.

The valve 10 has two valve components, i.e. a valve ring 26 and a tappet component 28. The tappet component 28 has a shank portion 30 which is linearly guided within a cylindrical guide 32 of the casing component 12. A disc-shaped portion 34 disposed at the lower end of the shank portion 30 has a conical surface 36 at its circumference. A closing spring 38 is arranged between the upper end of the casing component 12 and the disc-shaped portion 34.

Via a bolt 40, the disc-shaped portion 34 has coupled thereto a cap-shaped component 42 the edge of which is transmissive and has a flange 44 at the lower end.

The valve ring 26 has two annular discs 46, 48 which sandwich an annular seal 50 between them which has an outer sealing portion 52 circular in section and an inner sealing portion 54 circular in section. The latter bears against the conical surface 36 when the thermostat valve 10 is in the closing position whereas the sealing portion 52 bears against the valve seat 20.

Thus, in the position illustrated in FIG. 1 for the thermostat valve, the connection is interrupted to the water pump from the cooler. When the temperature rises in the cooling medium the expansive-material element 24 will actuate the tappet 56 and the tappet will move out over a certain length. As a result, the tappet component 28 travels upwards through a certain length, causing a passage to form between the inner sealing portion 54 and the cap-shaped component 42 since the sealing portion 54 has left the conical surface 36. This allows a certain flow volume to pass to the pump from the cooler. The force which needs to be overcome by the expansive-material element 24 is predetermined by the spring 38, on one hand, and the flow pressure at the connection 18, on the other. The flow pressure acts on a relatively small effective area as is defined by the tappet component 28.

If the tappet 56 of the expansive-material element 24 continues to be extracted upon an increase in temperature the valve ring 26 will be carried along by the flange 44 (FIG. 3), which causes the outer sealing portion 52 to be lifted off the valve seat 20 so that the thermostat valve 10 becomes completely opened and releases a relatively large flow cross-section.

Vice versa, while the thermostat valve 10 is closing, the valve ring 26 initially comes to bear against the valve seat 20 so that another flowing medium flow becomes possible through the passage between the inner sealing portion 54 and the tappet component 28 until the inner sealing portion 54 comes to bear on the conical surface 36.

The invention claimed is:

1. A thermostat valve for a cooling system of a combustion engine, comprising:
   a valve housing defining a valve seat;
   a valve member biased by a spring against the valve seat;
   a thermal extension element within the valve housing which acts on the valve member opposite to the spring,
   wherein the valve member comprises
      an annular member having an inner annular sealing portion and a first outer annular sealing portion biased by the spring against the valve seat; and
      a tappet component having a second outer annular sealing portion which, in a closed position of the tappet component, is pressed against the inner annular sealing portion of the annular member,
   wherein
   the tappet component cooperates with the thermal extension element to configure a passage between the inner sealing portion of the annular member and the second outer sealing portion of the tappet component in an initial movement of the tappet component by the thermal extension element, and the annular member is co-moved with the tappet component and lifted from the annular valve seat in a further movement of the tappet component;
   the annular member further comprises two annular discs and an annular sealing element which is sandwiched between the two annular discs, and
   the inner annular sealing portion and the first outer annular sealing portion are defined by sections of the annular sealing element which are exposed along inner and outer peripheries, respectively, of the two annular discs.

2. The thermostat valve of claim 1, wherein the second outer sealing portion of the tappet component is a conical surface of the tappet component.

3. The thermostat valve of claim 1, wherein the spring directly acts on the tappet component.

4. The thermostat valve of claim 1, wherein the tappet component has a radial flange portion adapted to engage with the annular member in the further movement of the tappet component by the thermal extension element.

5. The thermostat valve of claim 4, wherein the tappet component comprises a threaded element that connects the second outer sealing portion and the flange portion.

6. A thermostat valve for a cooling system, comprising:
   a valve housing defining a valve seat;
   a first valve member biased against the valve seat and defining a first passage;
   a second valve member biased against the a first valve member to sealingly close the first passage;
   a thermal extension element adapted to move the second valve member away from the first valve member to open the first passage at a first temperature, and to move both the first and second valve members away from the valve seat to open a second passage at a second temperature greater than the first temperature;

wherein the first valve member further comprises two annular discs and an annular sealing element which is sandwiched between the two annular discs and exposed on the outside of the two annular discs to directly, sealingly contact with the valve seat and the second valve member, the first passage is defined between (a) the annular sealing element exposed on an innermost periphery of the two discs and (b) the second valve member, and the second passage is defined between (i) the annular sealing element exposed on an outermost periphery of the two discs and (ii) the valve seat.

7. The thermostat valve of claim 1, wherein said tappet component is disposed on a first side of the annular sealing element and the thermal extension element is disposed on a second side of the annular sealing element, wherein the second side of the annular sealing element is opposite to the first side of the annular sealing element.

8. The thermostat valve of claim 7, wherein the second outer annular sealing portion of the tappet component co-acts with the inner annular sealing portion of the annular member on the first side of the annular member in the closed position of the tappet component or when the tappet component is moved into the closed position.

* * * * *